US010752180B2

(12) United States Patent
Rozitis et al.

(10) Patent No.: US 10,752,180 B2
(45) Date of Patent: Aug. 25, 2020

(54) SECONDARY RETENTION OF OPTICAL MEMBERS

(71) Applicant: Raytheon Canada Limited, Ottawa (CA)

(72) Inventors: Peter Rozitis, Midland (CA); Mikael Grans, Midland (CA); Edward Benneyworth, Midland (CA)

(73) Assignee: Raytheon Canada Limited (CA)

( * ) Notice: Subject to any disclaimer, the term of this patent is extended or adjusted under 35 U.S.C. 154(b) by 0 days.

(21) Appl. No.: 16/094,596

(22) PCT Filed: Apr. 18, 2016

(86) PCT No.: PCT/IB2016/000941
§ 371 (c)(1),
(2) Date: Oct. 18, 2018

(87) PCT Pub. No.: WO2017/182838
PCT Pub. Date: Oct. 26, 2017

(65) Prior Publication Data
US 2019/0168681 A1  Jun. 6, 2019

(51) Int. Cl.
*B60R 11/00* (2006.01)
*F42B 15/01* (2006.01)
*G01S 7/02* (2006.01)

(52) U.S. Cl.
CPC ............. *B60R 11/00* (2013.01); *F42B 15/01* (2013.01); *G01S 7/02* (2013.01); *G01S 2007/027* (2013.01)

(58) Field of Classification Search
CPC . B60R 11/00; F42B 15/01; G01S 7/02; G01S 2007/027; F21V 21/04; F21V 3/00; F21V 17/00; G08B 13/19617
See application file for complete search history.

(56) References Cited

U.S. PATENT DOCUMENTS 6,493,128 B1  12/2002  Agrawal et al.
6,896,423 B2   5/2005  Arbuckle et al.
(Continued)

FOREIGN PATENT DOCUMENTS

JP   2014160281 A   4/2014
JP   2015084001 A   4/2015
(Continued)

OTHER PUBLICATIONS

International Search Report for International Application No. PCT/IB2016/000941, dated Dec. 28, 2016, 7 pages.

*Primary Examiner* — Christopher Garft (57) ABSTRACT

A system for retaining an optical member about a vehicle is disclosed. The system can comprise a mount, an optical member having a first end and a second end, and a primary retention system operable to secure the second end of the optical member of the mount. The system can further comprise a secondary retention system. The secondary retention system can comprise a retaining clip coupled to one of the optical member and the mount, adjacent the second end of the mount. The retaining clip can comprise at least one aperture therethrough. The secondary retention system can further comprise a pin coupled to the other of the optical member and the mount. The pin can extend through the aperture of the retaining clip. The secondary retention system can activate to cause the pin to engage the retaining clip upon movement of the optical member relative to the mount and at least partial failure of the primary retention system.

16 Claims, 6 Drawing Sheets

(56) References Cited

U.S. PATENT DOCUMENTS

| | | | |
|---|---|---|---|
| 7,113,237 B2 | 9/2006 | Nitto et al. | |
| 7,300,248 B2 * | 11/2007 | Wang | F04D 25/088 248/343 |
| 7,841,782 B2 * | 11/2010 | Tatewaki | G03B 17/02 348/143 |
| 7,963,707 B2 | 6/2011 | Jung et al. | |
| 8,310,617 B2 | 11/2012 | Shmizu | |
| 9,051,010 B2 | 6/2015 | Young et al. | |
| 2010/0014152 A1 | 1/2010 | Robinson | |
| 2013/0114141 A1 | 5/2013 | Sindledecker et al. | |
| 2013/0114993 A1 * | 5/2013 | Korwan | G03B 17/02 403/27 |
| 2014/0063632 A1 * | 3/2014 | Jones | G02B 7/00 359/894 |

FOREIGN PATENT DOCUMENTS

| | | |
|---|---|---|
| WO | WO 2015/060195 A1 | 4/2015 |
| WO | WO 2015/063883 A1 | 5/2015 |
| WO | WO 2015/065376 A1 | 5/2015 |

* cited by examiner

SECONDARY RETENTION OF OPTICAL MEMBERS

BACKGROUND

High-accuracy optics are commonly used in military defense applications and space applications. Missile guidance systems, radar systems, infrared countermeasure systems, and other similar systems all utilize high-accuracy optics to deliver the performance sought for in such applications.

High-accuracy optics are often secured within an optical mount that employ the use of hemispherical or hyper-hemispherical optical domes as these facilitate an optically clear and consistent line of sight over as broad a spectrum as possible, free of obstacles, such as mounting hardware. However, there are very few options to provide positive retention to optical domed members. Typically, optical domes are fastened within a mounting member using an elastic adhesive or retainer rings. Screw rings are typically used to secure such members. However, when a dome approaches 180°, becoming a hemisphere, there is no longer a protruding diametrical area to which a screw ring can clamp. A hemispherical dome can be bonded in a mount using traditional methods; however, additional and practical fail-safe retention is not available

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" can be either abutting or connected. Such elements can also be near or close to each other without necessarily contacting each other. The exact degree of proximity can in some cases depend on the specific context.

An initial overview of technology embodiments is provided below and then specific technology embodiments are described in further detail later. This initial summary is intended to aid readers in understanding the technology more quickly, but is not intended to identify key features or essential features of the technology, nor is it intended to limit the scope of the claimed subject matter.

A system for retaining an optical member about a vehicle is disclosed. The system can comprise a mount, an optical member having a first end and a second end, and a primary retention system operable to secure the second end of the optical member to the mount. The system can further comprise a secondary retention system. The secondary retention system can comprise a retaining clip coupled to one of the optical member or the mount, adjacent the second end of the mount. The retaining clip can comprise at least one aperture therethrough. The secondary retention system can further comprise a pin or a screw coupled to the other of the optical member or the mount. The pin or screw can extend through the aperture of the retaining clip. The secondary retention system can be activated to cause the pin or screw to engage the retaining clip upon movement of the optical member relative to the mount and at least partial failure of the primary retention system.

In one exemplary embodiment, a secondary retention system for an optical member is disclosed. The secondary retention system can comprise a retaining clip coupled to one of an optical member (e.g., a hemispherical or semi-hemispherical optical member) or a mount operable to support the optical member. The optical member can be secured to the mount via a primary retention system, thereby providing primary retention of the optical member about the mount. The retaining clip of the secondary retention system can comprise at least one aperture therethrough. The secondary retention system can further comprise a pin or a screw. The pin or screw can be coupled to the other of the optical member or the mount, and can further be operable with the at least one aperture of the retaining clip. The pin or screw can be operable to engage the retaining clip upon movement of the optical member relative to the mount, and at least partial failure of the primary retention system. Upon such movement and subsequent engagement of the secondary retention system, the pin or screw and the retaining clip can provide secondary retention of the optical member, wherein the secondary retention system functions as a fail-safe to maintain the optical member about the mount in the event the primary retention system becomes incapable of performing this function alone.

Further disclosed is a method for providing secondary, fail-safe retention of an optical member about a vehicle. The method can comprise obtaining an optical member having a first end and a second end opposite the first end. The method can further comprise obtaining a mount on a vehicle operable to receive and support the optical member. The method can further comprise securing the first end of the optical member to the mount using a primary retention system. The method can further comprise utilizing a secondary retention system of the optical member about the mount, the secondary retention system comprising a retaining dip secured to one of the optical member or the mount, the retaining clip comprising an aperture therethrough; and a pin secured to the other of the optical member or the mount. The method can further comprise facilitating extension of the pin through the aperture, such that the pin is operable to engage the retaining clip upon movement of the optical member relative to the mount and at least partial failure of the primary retention system, the pin and the retaining clip acting together to provide positive retention of the optical member.

Figure 1A:
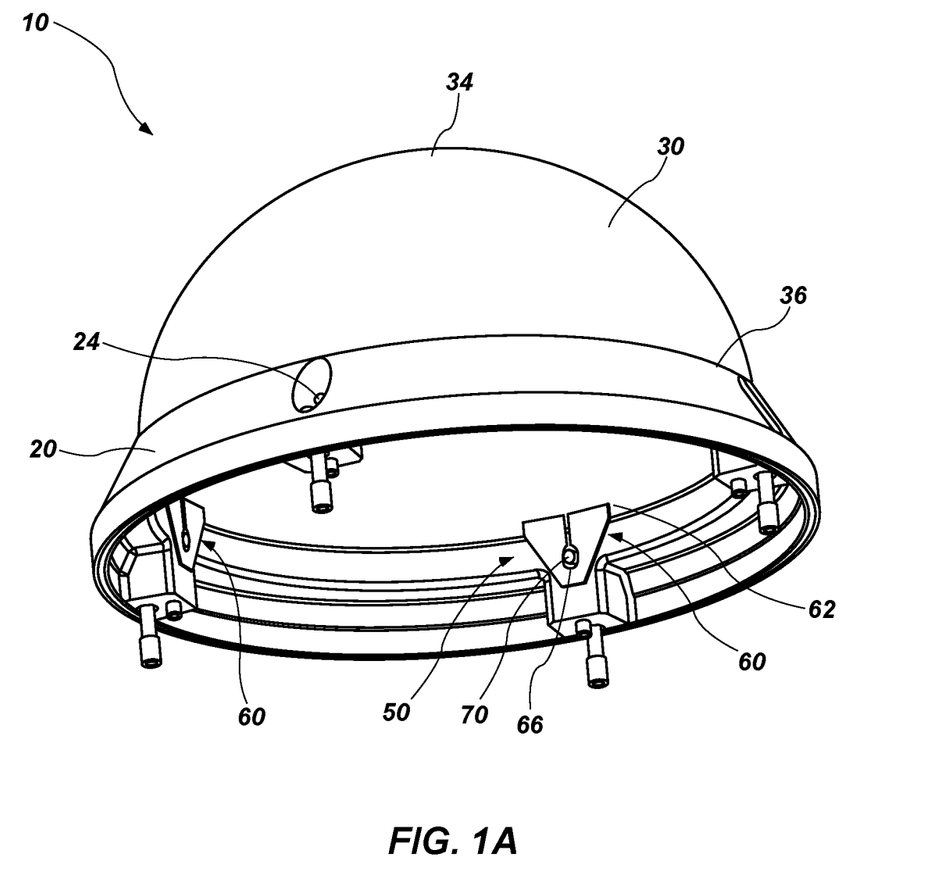
FIG. 1A illustrates a perspective view of an example system for retaining an optical member about a vehicle, the system employing primary and secondary retention systems, in accordance with an example of the present disclosure.
Figure 1B:
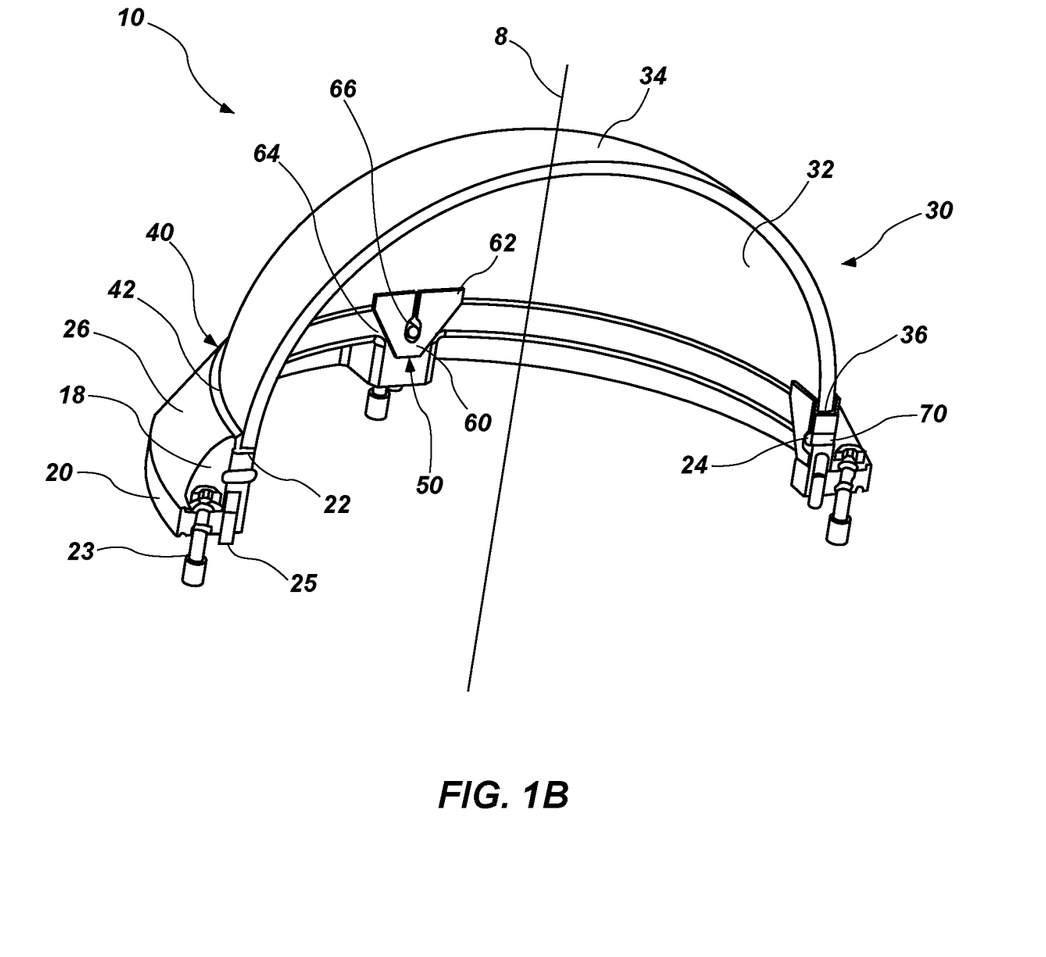
FIG. 1B illustrates a cross-sectional perspective view of the system of FIG. 1A.
Figure 1C:
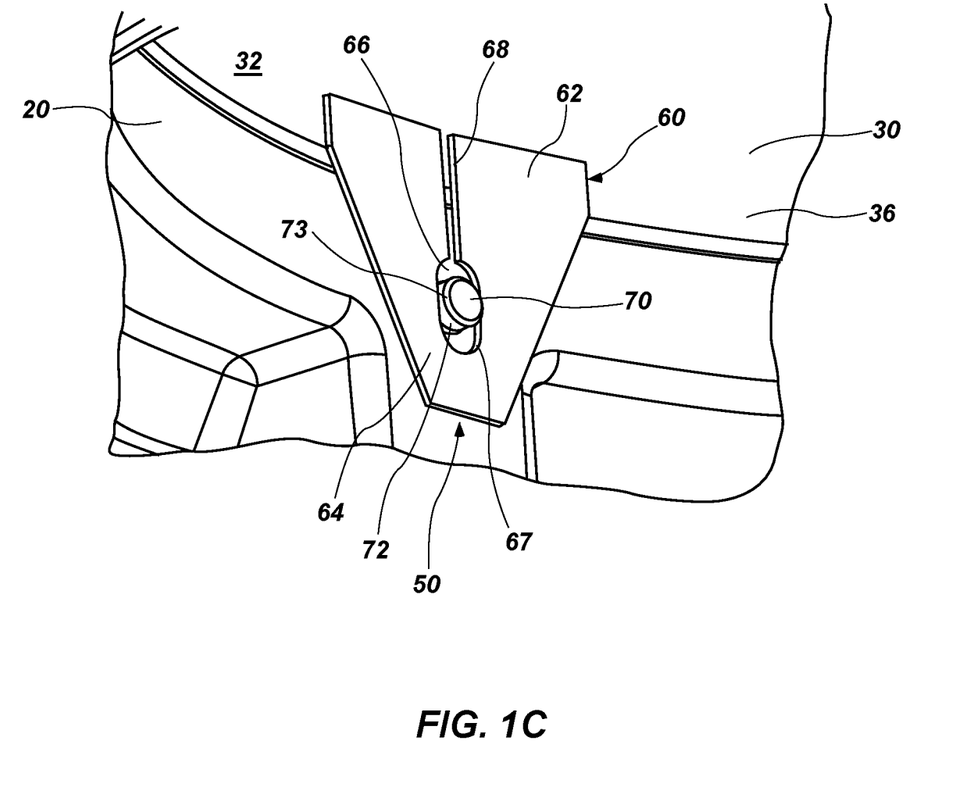
FIG. 1C illustrates a detailed perspective view of the secondary retention system of the example system of FIG. 1A.
Figure 2:
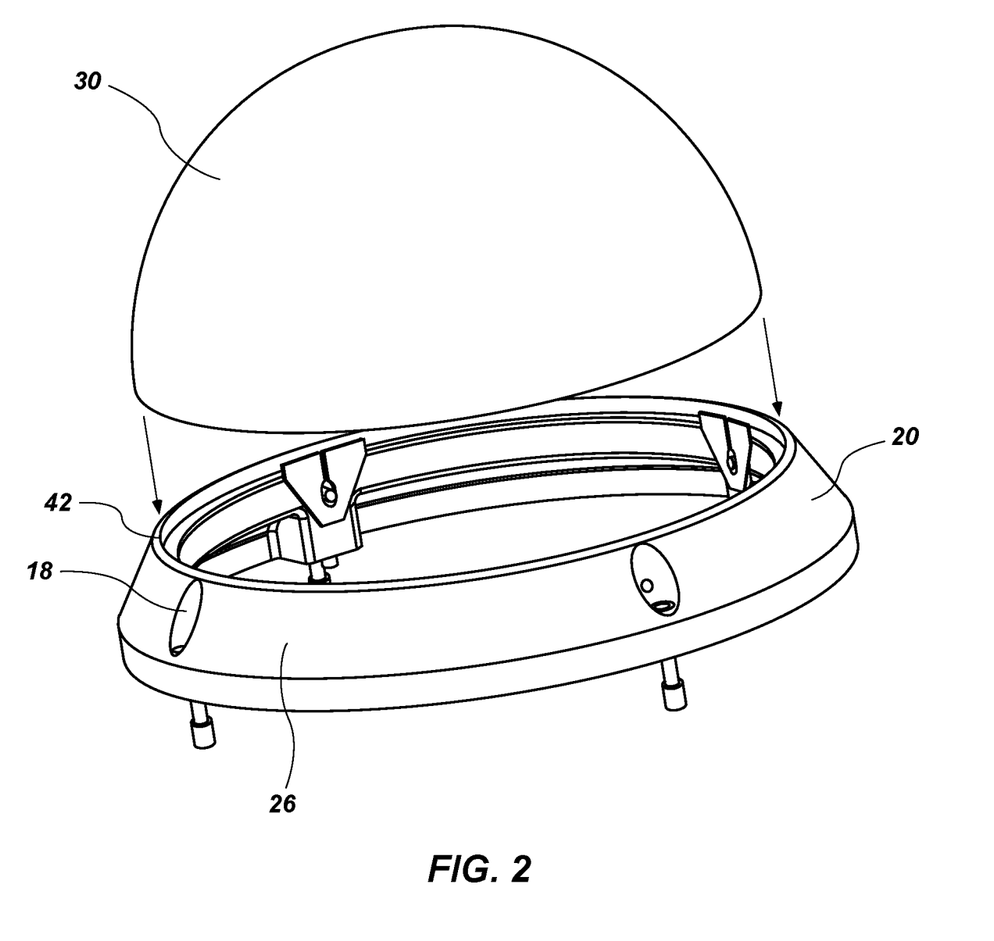
FIG. 2 illustrates an exploded perspective view of an optical member and a corresponding mount of the example system of FIG. 1A.

With reference to FIGS. 1A-1C, illustrated is a system 10 for retaining an optical member about a vehicle. In this example, the system 10 can comprise a mount 20, such as a bezel mount. The system 10 can further comprise an optical member 30 supported about the mount 20. The optical member 30 can comprise a first end 34 (e.g., a closed end) and a second end 36 (e.g., an open end).

In some aspects, the optical member 30 can be utilized in connection with precision optics, and can comprise a dome, such as a hemispherical or hyper-hemispherical arrangement. In some examples, the optical member 30 can be utilized to contain and protect various electronics systems, such as guidance systems, radar systems, infrared countermeasure systems, and other similar systems. These systems can be used in conjunction with a vehicle, such as, for example a missile, an unmanned air vehicle, or other similar vehicles.

In order to provide proper protection and simultaneously provide adequate optical characteristics, the optical member 30 can comprise glass or a similar material. Furthermore, the optical member 30 can comprise a substantially uniform thickness.

The first end 34 of the optical member 30 can comprise the closed end of the hemispherical arrangement. The second end 36 can comprise the edge and open end of the optical member 30 defining the opening of the hemispherical arrangement opposite the first end 34.

The mount 20 can comprise a shape substantially compatible with the optical member 30 (and the vehicle). The mount 20 can function to provide support to the optical member 30 by receiving and securing thereto the optical member 30. In one example, the mount 20 can comprise a bezel-type mount to support the optical member 30. The mount 20 can comprise a lip 22. The lip 22 can be configured and operable to facilitate retaining of the second end 36 of the optical member 30.

The mount 20 can further comprise a fastener 23 and a stud 25. Fastener 23 can pass through the mount 20 and can act to secure the mount 20 to a vehicle (not shown), such as atop a missile as will be recognized by those skilled in the art. Stud 25 can be partially embedded within the mount 20 and can act to further secure the mount 20 to a vehicle, and can further function to aid in alignment of the mount 20 relative to the vehicle.

The mount 20 can comprise any suitable materials. In one example, the mount 20 can comprise a material such as steel or a similar material capable of supporting the optical member 30 in rugged environments.

The system 10 can further comprise a primary retention system 40 operable to secure the optical member 30 to the mount 20, and more specifically, the second end 36 of the optical member 30 within and to the lip 22 of the mount 20. In one example, the primary retention system 40 can comprise an adhesive-based retention system, such as an adhesive agent, operable to bind to the mount 20 within the lip 22 and also to bind to the second end 36 of the optical member 30. In this example, the primary retention system 40 can provide a pliable joint to account for shocks, vibrations and/or thermal expansion displacement and stresses of or within the optical member 30 relative to the mount 20. Other types of primary retention systems, other than an adhesive-based retention system are possible, and are also contemplated herein, as will be recognized by those skilled in the art.

In one example, the adhesive-based primary retention system 40 can comprise a commercial compliant polymer adhesive agent, such as a urethane or silicone based adhesive to bond the dissimilar optical member 30 and the mount 20. Urethane adhesives are commercially available, such as Arathane® 5753 or Arathane®5750, Silcoset 105, or Elastosil RT 601. The optical member 30 can be seated about the mount 20 with the second end 36 of the optical member 30 inserted or placed about the lip 22. Subsequently, the adhesive can be inserted or disposed between the lip 22 and the second end 36 of the optical member 30 and can then be allowed to cure, thus bonding to the lip 22 to the second end 36, and thus securing the optical member 30 to the mount 20, and forming the primary retention system 40 retaining the optical member 30 to the mount 20.

The system 10 can further comprise a secondary retention system 50. The secondary retention system 50 can be utilized and activated in the event the primary retention system 40 fails, or at least partially fails, such that there is relative movement between the optical member 30 and the mount 20 beyond an acceptable or desired degree. The secondary retention system 50 can comprise one or more retaining clips 60 (some exemplary embodiments can comprise multiple retaining clips and associated hardware). The retaining clip 60 can be coupled to one of the optical member 30 or the mount 20. In one example, the retaining clip 60 can comprise a rigid material, such as, for example, stainless steel, aluminum, aerospace-grade composites, or other similar materials. In one example, the retaining clip 60 can be secured or coupled to one of the optical member 30 or the mount 20 using bonding agent, such as a high strength, rigid, two part epoxy such as EPO-TEK 301-2, ECCOBOND 45/Catalyst 15 or Masterbond EP30LTE. In a still further example, the retaining clip 60 can be secured or coupled using a tongue and groove arrangement between the retaining clip 60 and one of the optical member 30 or the mount 20. In one aspect, the retaining clip 60 can be coupled about the second end 36 of the optical member 30.

The retaining clip 60 can comprise at least one aperture 66 therethrough. The at least one aperture 66 can be aligned with an opening 24 formed in the mount 20. Opening 24 can be configured to receive a pin 70 or other type of fastener designed to pass through the mount 20 from the outside, and to be supported by the mount 20, and to be received within the aperture 66 of the retaining clip 60, as discussed in more detail below.

Figure 3:
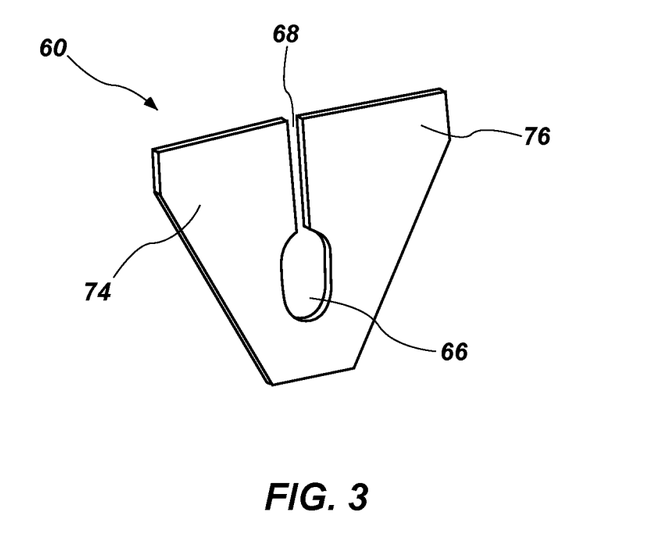
FIG. 3 illustrates a perspective view of the retaining clip of the example system of FIG. 1A.

Referring to FIG. 3, the retaining clip 60 is shown in greater detail. Retaining clip 60 can comprise a low-profile design. Retaining clip 60 can further be at least partially tapered from the top of the retaining clip 60 to the bottom of the retaining clip 60. As discussed, the retaining clip 60 can comprise an aperture 66 therethrough, the aperture being circumscribed by an edge 67. The retaining clip 60 can further comprise one or more elongated expansion slots 68. The elongated slot 68 can extend from the aperture 66 to an outer edge of the retaining clip 60, or be placed parallel to the shown slot. The elongated slot 66 can further be configured to provide a degree of free movement of the optical member 30 before becoming engaged with pin 70. The purpose of the elongated slot 68 is to allow expansion or contraction of the clip 60 when attached to optical member 30, as optical member 30 and clip 60, made of differing materials, expand and contract at different rates. The retaining clip 60 can further comprise a first ear 74 and a second ear 76. Each ear can be coupled to the optical member 30, such as by using an adhesive as described herein, wherein this coupling prevents a bridging effect that could possibly contribute to failure of the secondary retention system 50.

Figure 4:
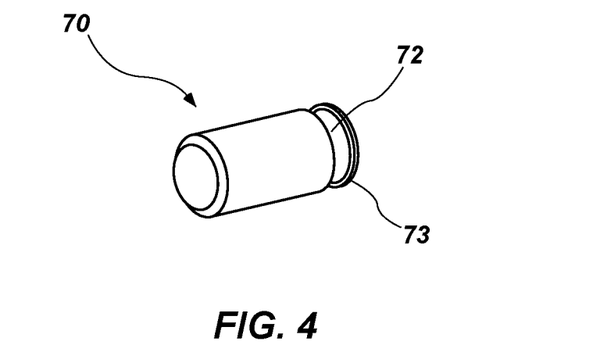
FIG. 4 illustrates a perspective view of the pin of the example system of FIG. 1A.

FIG. 4 illustrates the pin 70 in greater detail. The pin 70 can further comprise a groove 72 formed around a circumference of an end of the pin 70, the groove 72 defining a rim 73. The groove 72 can be operable to receive an edge of the retaining clip defining the aperture thereof in the event of failure of the primary retention system, as will be discussed further below.

Referring to FIGS. 1-4, the retaining clip 60 can be mounted to the optical member 30. As discussed herein, in one example, the optical member 30 can comprise a hemispherical arrangement, having a circular profile at the second end 36, near the location where retaining clip 60 couples to the optical member 30. The elongated slot 68 can allow the retaining clip 60 to flex to match the contour of the optical member, thus facilitating a more suitable interface between the retaining clip 60 and the optical member 30, and thus preventing the retaining clip 60 from forming a solid bridge across a portion of the optical member 30. For example, a retaining clip unable to flex and match the contour of the optical member 30 may provide a less suitable interface, such as one in which a bridge is formed between opposite ends or edges of the retaining clip 60. In this scenario, it is possible that a center section of the retaining clip 60, being located a greater distance from the optical member 30, creates a condition where the retaining clip 60 is only partially coupled to the optical member 30. In this condition, the retaining clip could have a higher likelihood of failing due to cracking or advanced degradation of the bond between the retaining clip 60 and the optical member 30, which could cause failure of the secondary retention system 50.

As indicated, the secondary retention system 50 can further comprise the pin 70 coupled to the other of the optical member 30 or the mount 20. As illustrated, the pin 70 can be operable with the mount 20. Opening 24 formed in the mount 20 can be operable to receive and accommodate the pin 70, wherein the pin 70 can be secured to the mount 20 upon passing through the opening 24. As shown, the pin 70 can be inserted into the opening 24 from the outside of the mount, and configured to extend through the aperture 66 of the retaining clip 60, such that a portion of the pin 70 extends inward beyond the aperture 66 and the retaining clip 60. In a further example, the pin 70 can be integrally formed with the mount 20, or can be configured to be actuatable, wherein the pin 70 can be caused to retract into and extend out of the mount 20.

The secondary retention system 50 can activate to cause the pin 70 and the retaining clip 60 to engage one another upon movement of the optical member 30 relative to the mount 20 in one or more directions beyond an acceptable or desired amount. Specifically, the pin 70 and the retaining clip 60 can engage one another upon movement of the optical member 30 relative to the mount 20 due to at least partial failure of the primary retention system 40. Partial failure of the primary retention system 40 can occur if the bond (or fastening/coupling connection) between the adhesive and at least one of the mount 20 and the optical member 30 weakens, breaks, or at least partially breaks, allowing movement between these components, such that the second end 36 of the optical member 30 becomes at least partially unsecured from the mount 20. In other words, partial failure of the primary retention system 40 can result in the optical member 30 moving and separating, at least partially, from the mount 20. Of course, complete failure of the primary retention system 40 will also result in movement of the optical member 30 relative to the mount 20. Movement and separation of the optical member 30 from the mount 20 will likely be at least partially in the direction along axis 8, wherein the optical member 30 and the mount are caused to move away from one another. Movement in this direction can be achieved by all or some of the optical member 30, depending upon the degree of failure of the primary retention system 40. Indeed, partial or complete failure of the primary retention system can induce translational movement, as well as a degree of rotation of the optical member 30 relative to the mount 20. Movement in a lateral direction can occur, but this type of movement will likely be constrained or limited due to the presence of the lip 22 formed in the mount 20. In the event the primary retention system fails such that the optical member 30 overcomes the lip 22, movement in the lateral direction can increase. Movement in the lateral direction or other translational directions can further be greater in examples where no lip is present.

In the example shown, the primary retention system 40 can comprise an elastic bond 42. The elastic bond 42 can be the primary bond between the optical member 30 and the mount 20, actively retaining and supporting the optical member 30 about and within the mount 20. In a complimentary fashion, the secondary retention system 50 can provide rigid retention to the optical dome 30 upon activation of the secondary retention system 50 (e.g., upon the pin 70 engaging the retaining clip 60). Such rigid retention can provide active, positive retention to the optical member 30. The positive retention can secure the optical member 30 and prevent movement of the optical member 30 in both the lateral and vertical directions, preventing loss of the optical member 30 upon failure of the primary retention system 40. Providing "rigid" retention of the optical member 30 about the mount 20 is intended to mean that little to no pliability exists within the retention system once activated, such as once the pins 70 engage the retaining clip 60. Rigid retention can be provided or facilitated by configuring the components of the secondary retention system 50 to be rigid, as well as using mounting or coupling arrangements that also provide rigidity.

At least an upper portion 62 of the retaining clip 60 can be coupled to an inner surface 32 of the optical member 30, thereby securing the retaining clip 60 to the inside of the optical member 30, with the remaining portions of the retaining clip 60 and the aperture 66 extending a distance below an edge of the second end 36 of the optical member 30 onto or about the bezel of the mount 20, thereby aligning the aperture 66 with the opening 24 formed in the mount 20. As shown, at least a second portion 64 of the retaining clip 60 can be positioned below the second end 36 of the optical member 30. The aperture 66 can be located in the second portion of the retaining clip 60. As such, the aperture 66 can be positioned adjacent to an inner surface 28 of the mount 20. The mount 20 can further comprise an opening 24 therethrough, extending from an outer wall or surface 26 to the inner surface 28. The opening 24 can further be formed within a recess 18. As illustrated, the aperture 66 can be aligned with the opening 24 upon securely seating and supporting the optical member 30 onto/about the mount 20. Once the optical member 30 is in place, the pin 70 can be caused to pass through the opening 24 of the mount 20 and the aperture 66 of the retaining clip 60. The pin 70 can further be coupled to or otherwise secured to the mount 20, thus preventing the pin 70 from exiting the opening 24. The pin 70 can be operable to fit within and extend beyond the opening 24, and can further be configured to be out of contact with the retaining clip 60 during normal operation and function of the optical member 30 and mount 20. Contact of the pin 70 with the retaining clip 60 can be configured to occur only after at least partial failure of the primary retention system 40, upon which the secondary retention system 50 becomes active and the one or more pins 70 captured within the one or more retaining clips 60 to maintain the coupling of the optical member 30 to the mount 20 despite the failure or partial failure of the primary retention system 40. In other words, the pin 70 can be sized and can be operable to not contact the retaining clip 60 when the primary retention system is functioning, such that the optical member 30 must move away from the mount 20 in order for the pin 70 to engage the retaining clip 60.

As indicated above, the secondary retention system 50 is employed upon the optical member 30 moving in one or both of vertical and lateral directions relative to the mount 20, likely due to at least partial failure of the primary retention system 40. Such a failure can occur if the adhesive bond between the optical member 30 and the mount 20 weakens due to age or under an excessive loading condition. Under these conditions, such movement will cause the pin 70 to become engaged with the retaining clip 60. When properly installed and aligned, proper implementation of the secondary retention system 50 will cause the retaining clip 60 to come in contact with the pin 70, and specifically, will cause the edge 67 of the retaining clip 60 to be seated within the groove 72 of the pin 70, the edge 67 being secured by the groove 72 and the rim 73 formed adjacent the groove 72. In this way, the retaining clip 60 is "captured" by the pin 70, and the optical member 30 maintained in a secured relationship with the mount 20. Upon the pin 70 engaging the retaining clip 60, the pin 70 and the retaining clip 60 can operate to provide secondary retention to the optical member 30. Such secondary retention can prevent or limit movement of the optical member 30 relative to the mount 20 in both vertical and lateral directions.

As stated above, the secondary retention system 50 can comprise multiple retaining clip/pin arrangements spaced apart from one another and positioned to provide secondary retention of the optical member 30 no matter the direction of movement of the optical member 30 caused by the failure of the primary retention system. Indeed, although only four of such retaining clip/pin arrangements are shown existing on the example vehicle (e.g., missile), those skilled in the art will recognize that any number may be employed.

Figure 5:
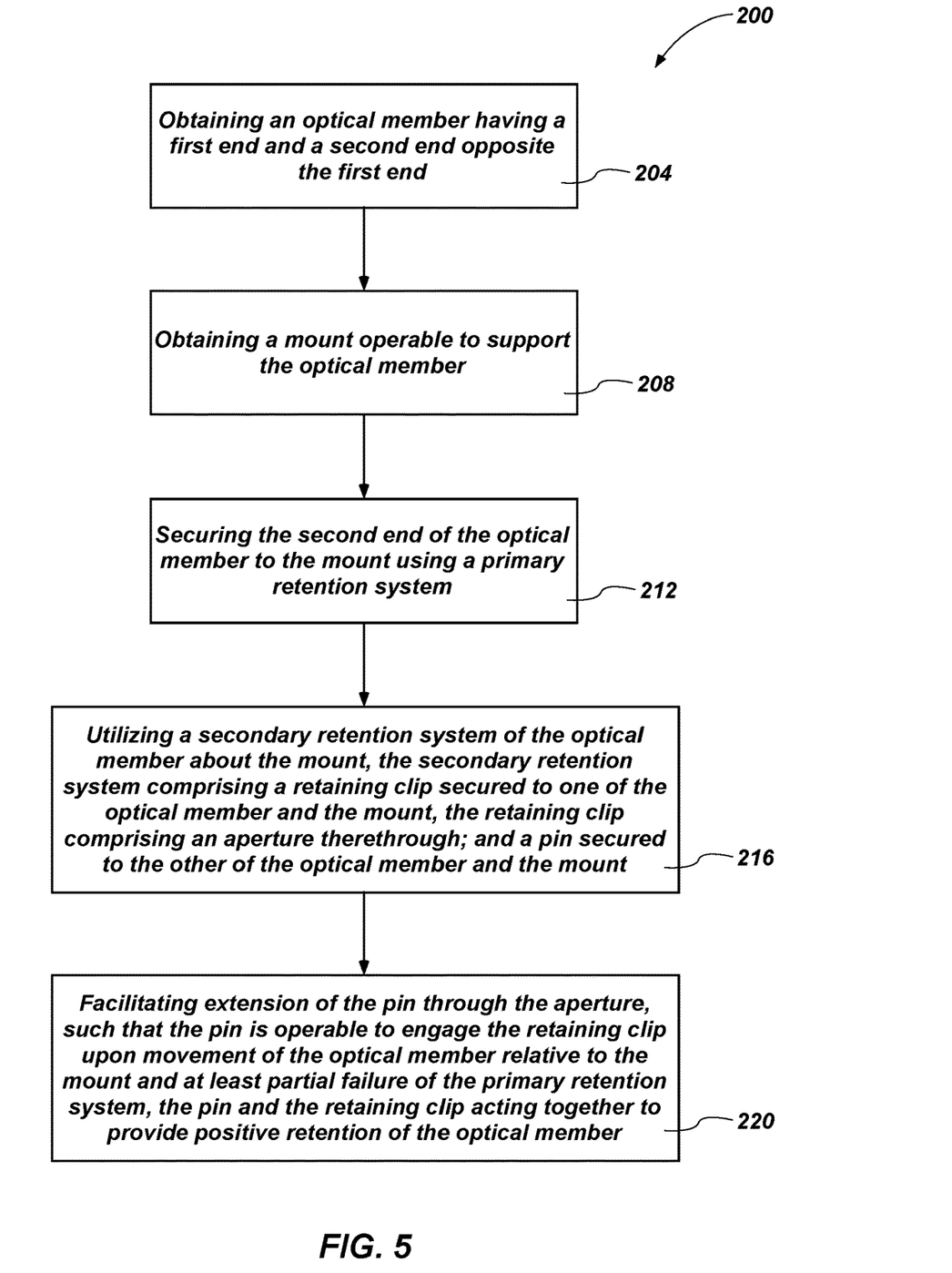
FIG. 5 illustrates a flow diagram of an exemplary method for providing secondary, fail-safe retention of an optical member about a vehicle, in accordance with an example of the present disclosure.

The present disclosure further sets forth a method 200 of providing secondary, fail-safe retention of an optical member about a vehicle. The method can comprise, at 204, obtaining an optical member having a first end and a second end opposite the first end. The method can further comprise, at 208, obtaining a mount operable to support the optical member. The method can further comprise, at 212, securing the second end of the optical member to the mount using a primary retention system. The method can further comprise, at 216, utilizing a secondary retention system of the optical member about the mount, the secondary retention system comprising a retaining clip secured to one of the optical member and the mount and having an aperture therethrough, and a pin secured to the other of the optical member and the mount. The method can further comprise, at 220, facilitating extension of the pin through the aperture, such that the pin is operable to engage the retaining clip upon movement of the optical member relative to the mount and at least partial failure of the primary retention system, the pin and the retaining clip acting together to provide positive retention of the optical member.

Securing the optical member to the mount using the primary retention system can comprise using an adhesive, such as, for example, an elastic adhesive, designed to absorb impact and vibrations induced during use. The adhesive can be applied or deposited in a substantially liquid form between the optical member and the mount and allowed to cure.

Providing the secondary retention system can comprise coupling the retaining clip to one of the optical member and the mount, and coupling the pin to the other of these. For example, the method can comprise coupling the retaining clip to the optical member and coupling the pin to the mount. The retaining clip can comprise an aperture therethrough, and the method can comprise the aperture being operable with the pin, as described herein.

The pin and the retaining clip can act together to provide positive retention of the optical member upon movement of the optical member relative to the mount and at least partial failure of the primary retention system.

The method can further comprise obtaining a hemispherical optical dome, or a hyper-hemispherical dome.

The method can further comprise coupling the retaining clip having an elongated slot to the optical member, which can specifically comprise flexing the retaining clip and coupling each portion of the retaining clip on either side of the elongated slot to the optical member, such that the retaining clip can be fully coupled to a curved inner surface of the optical member. The method can further comprise aligning the aperture with an opening in the mount and inserting the pin through the opening and the aperture.

Although described specifically in terms of the secondary retention system comprising a retaining clip and pin arrangement, those skilled in the art will recognize that the methods described herein can be applicable and useful with different configurations and arrangements of a secondary retention system operable to function as intended herein. As such, the specific examples discussed herein should not be limiting in any way.

It is to be understood that the examples of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics can be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for retaining an optical member about a vehicle, comprising:
   a mount;
   an optical member having a first end and a second end;
   a primary retention system operable to secure the second end of the optical member to the mount;
   a secondary retention system comprising:
      a retaining clip coupled to one of the optical member and the mount adjacent the second end, the retaining clip comprising at least one aperture therethrough; and
      a pin coupled to the other of the optical member and the mount and extending through the aperture,
      wherein the secondary retention system activates to cause the pin to engage the retaining clip upon movement of the optical member relative to the mount and at least partial failure of the primary retention system, the pin being maintained out of contact with the retaining clip until the at least partial failure of the primary retention system.

2. The system of claim 1, wherein the primary retention system comprises an elastic bond between the second end of the optical member and the mount, and wherein the secondary retention system provides rigid retention of the optical member upon the pin engaging the retaining clip.

3. The system of claim 2, wherein the retaining clip is coupled to the optical member and the pin is operable to be coupled to the mount.

4. The system of claim 3, wherein at least a portion of the retaining clip is coupled to at least a portion of an inner surface of the optical member.

5. The system of claim 4, wherein at least a second portion of the retaining clip is positioned below the second end of the optical member, and wherein the aperture formed within the second portion of the retaining clip.

6. The system of claim 1, wherein the mount further comprises an opening therethrough, and wherein the aperture is aligned with the opening and the pin is operable to pass through the opening and the aperture, the pin further being operable to be coupled to the mount.

7. The system of claim 1, wherein the retaining clip further comprises an elongated slot formed therein, the elongated slot facilitating flexing of the retaining clip to match a contour of an inner surface of the optical member.

8. The system of claim 1, wherein the optical member comprises a hemispherical member.

9. A secondary retainer as part of a secondary retention system for securing an optical member about a mount upon failure of a primary retention system, comprising:
   a retaining clip coupled to one of an optical member and a mount operable to support the optical member, the optical member configured to be secured to the mount via a primary retention system, wherein the retaining clip comprises at least one aperture therethrough; and
   a pin coupled to the other of the optical member and the mount and operable with the at least one aperture to engage the retaining clip upon at least partial failure of the primary retention system and movement of the optical member relative to the mount, the pin and the retaining clip providing secondary retention to the optical member, wherein the pin is maintained out of contact with the retaining clip with the primary retention system activated, such that the optical member must move relative to the mount in order for the pin to engage the retaining clip.

10. The secondary retainer of claim 9, wherein the retaining clip and the pin form a rigid retainer.

11. The secondary retainer of claim 9, wherein the retaining clip is operable to be coupled to an interior of one of the optical member and the mount.

12. The secondary retainer of claim 9, wherein the retaining clip further comprises an elongated slot formed therein, the elongated slot facilitating flexing of the retaining clip to match a contour of an inner surface of the optical member.

13. A method for providing secondary, fail-safe retention of an optical member about a vehicle, the method comprising:
   obtaining an optical member having a first end and a second end opposite the first end;
   obtaining a mount operable to support the optical member;
   securing the second end of the optical member to the mount using a primary retention system;
   utilizing a secondary retention system of the optical member about the mount, the secondary retention system comprising a retaining clip secured to one of the optical member and the mount, the retaining clip comprising an aperture therethrough; and a pin secured to the other of the optical member and the mount; and
   aligning the aperture of the retaining clip with an opening in the mount and facilitating extension of the pin through the opening and the aperture, such that the pin is operable to engage the retaining clip upon movement of the optical member relative to the mount and at least partial failure of the primary retention system, the pin and the retaining clip acting together to provide positive retention of the optical member.

14. The method of claim 13, wherein obtaining an optical member comprises obtaining a hemispherical or semi-hemispherical optical member.

15. The method of claim 13, further comprising securing the retaining clip to the optical member and securing the pin to the mount.

16. The method of claim 13, further comprising flexing the retaining clip to match a contour of an inner surface of the optical member or the mount.

* * * * *